United States Patent [19]

Boller et al.

[11] Patent Number: 4,474,826
[45] Date of Patent: Oct. 2, 1984

[54] METHOD OF OBTAINING COATED GLASS ARTICLES

[75] Inventors: Thomas E. Boller, Southfield; Narayandas Malani, Grosse Ile, both of Mich.

[73] Assignee: Ford Motor Company, Dearborn, Mich.

[21] Appl. No.: 491,145

[22] Filed: May 4, 1983

[51] Int. Cl.³ .......................... B05B 5/00; B05D 5/06; B05D 5/12

[52] U.S. Cl. ..................................... 427/10; 427/110; 427/160; 427/165; 427/168

[58] Field of Search ................. 427/10, 110, 160, 165, 427/168

[56] References Cited

U.S. PATENT DOCUMENTS 4,374,156 2/1983 Vong .............................. 427/168 X Primary Examiner—Michael R. Lusignan
Attorney, Agent, or Firm—William E. Johnson; Olin B. Johnson

[57] ABSTRACT

This disclosure is directed to a method of obtaining coated glass articles having a desired shading coefficient with the most economical thickness of coating composition applied thereto. The method taught is characterized by the following steps. A plurality of glass samples are coated with a selected coating composition. This coating operation is carried on the various glass samples in a manner such that the glass samples have different coating thicknesses of the selected coating composition. The thickness of the coating composition on each glass sample, along with the resulting shading coefficient, is measured. The correlation is made between the thickness of coating and the resulting shading coefficient. The correlation is one which will define two separate functions interconnected by a transition point. A first function (1) is one in which the shading coefficient decreases with increasing coating thickness. A second function (2) is one in which the shading coefficient remains relatively constant although the coating thickness is increasing. The method of this disclosure is concluded by coating commercial quantities of glass with the selected coating composition to a thickness which is plus or minus 10% of the coating thickness where the correlated relationship between the coating thickness and the shading coefficient goes through its transition point (3) from the first defined functional relationship (1) to the second defined functional relationship (2).

4 Claims, 2 Drawing Figures

80% Co-20% Fe FILM

95% Co-5% Fe FILM

METHOD OF OBTAINING COATED GLASS ARTICLES

TECHNICAL FIELD

This specification is directed to a method of obtaining coated glass articles and, in particular, to a method of coating glass articles with a coating composition so that the coated glass article has a desired shading coefficient with the most economical thickness of coating composition thereon.

BACKGROUND ART AND PRIOR ART STATEMENT

No search was conducted on the subject matter of this specification in the U.S. Patent and Trademark Office or in any other search facility.

We are unaware of any prior art which is relevant to the method disclosed in this specification. We are aware of patents relating to the application of coating materials to glass articles in order to develop a coated glass article. However, these patents generally show various ways of applying a coating material to a glass article and they contain no teachings directed to the method of this invention.

Modern architects today use vast amounts of glass for enclosing large buildings such as commercial office buildings and hotels. The glass used in such structures is generally a high performance reflective glass which is effective in reflecting heat and light so that it does not enter the building's interior. A measure of a glass' ability to reflect heat and light is a measure which in the industry is known as a "shading coefficient." A shading coefficient is defined as the ratio of the solar heat gain for any given glass to the solar heat gain under the same conditions for $\frac{1}{8}$ inch clear glass. The industry also knows that high performance reflective glass has a shading coefficient of 0.40 or less.

In many cases, the glass itself, for example, a bronze body color or a green body color glass, will have a shading coefficient based upon the body color in the glass and the thickness of the glass. For example, a normal bronze body glass having a thickness of $\frac{1}{4}$ inch would have a shading coefficient of 0.71. In order to decrease the shading coefficient (which results in a reduction of the value of the shading coefficient), a metallic oxide film can be applied on one of the surfaces of the glass sheet. This metallic oxide film results in an overall reduction of the shading coefficient of the so-treated glass sheet. In most cases, such filmed glass is assembled into the building with the surface having the film thereon facing into the interior of the building so that the film is protected from the elements. If a two sheet insulated window is formed, the film surface is on the sealed side of the window.

DISCLOSURE OF THE INVENTION

This invention is directed to a method of obtaining coated glass articles and, more particularly, to a method of obtaining coated glass articles having a desired shading coefficient with the most economical thickness of coating composition thereon. The method is characterized by having the following steps.

A plurality of glass samples are coated with a selected coating composition. This coating operation is carried on the various glass samples in a manner such that the glass samples have different coating thicknesses of the selected coating composition.

The thickness of the coating composition on each glass sample is measured. The shading coefficient of each of the glass samples is also measured.

The relationship of the thickness of the coating composition and the resulting shading coefficient of each glass sample is correlated. The correlation defined by the relationship of the thickness and the coating composition of each glass sample generally is one which defines two separate functions interconnected by a transition point. A first defined function is one in which the shading coefficient decreases with increasing coating thickness. The second function is one in which the shading coefficient remains relatively constant, although the coating thickness is increasing.

The method concludes by coating commercial quantities of glass with the selected coating composition to a thickness which is plus or minus 10% of the coating thickness where the correlated relationship between the coating thickness and the shading coefficient goes through its transition point from the first defined functional relationship to the second defined functional relationship.

Our inventive method saves on the undue application of coating material beyond a coating thickness which achieves the best shading coefficient for that selected coating composition.

Our inventive method thus is one which produces coated glass articles having the best shading coefficient with the expenditure of just the right amount of the selected coating composition. Such action ensures the most economical production of such articles and also ensures that substantially excessive thicknesses of coating composition are not built up, which can be detrimental to the appearance of the surface of the glass article.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in conjunction with the accompanying drawings, in which:

BEST MODE AND INDUSTRIAL APPLICABILITY

The following description is what we consider to be a preferred embodiment of our method of obtaining coated glass articles. The following description also sets forth what we now contemplate to be the best mode of carrying out the method of our invention. This description is not intended to be a limitation upon the broader principles of this method, and while preferred materials are used to illustrate the method in accordance with the requirements of the patent laws, it does not mean that the method is operative only with the stated materials as others may be substituted therefor.

EXAMPLE 1

The method of this invention is initiated by selecting a plurality of glass samples for coating. In the first case, grey body color glass having ⅛" thickness was cut into a plurality of samples. This grey body color glass normally has a shading coefficient of 0.84. Various samples of glass were coated by heating the glass to a temperature of 1050° F. and spraying on the glass an 80% cobalt acetylacetonate-20% iron acetylacetonate mixture dissolved in dichloromethane. The spray pyrolyzes when it impinges upon the heated glass sheet to form a metallic oxide film of the two components on the surface of the glass sheet. By increasing the spraying time, different thicknesses of film were built up on the glass surface. The film thickness in nanometers (nm) and resulting shading coefficient (dimensionless) are correlated in Table 1 below.

TABLE 1

| Example | Shading Coefficient | Thickness |
|---------|---------------------|-----------|
| 1 | .46 | 50 |
| 2 | .44 | 55 |
| 3 | .40 | 75 |
| 4 | .38 | 80 |
| 5 | .37 | 85 |
| 6 | .37 | 125 |
| 7 | .37 | 170 |

Figure 1:
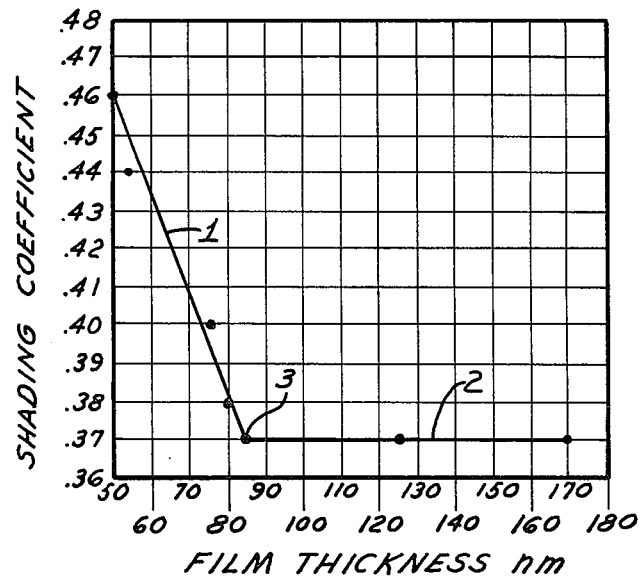
FIG. 1 is a graphical presentation of data showing shading coefficient versus film thickness for a glass sheet in which an 80% cobalt-20% iron containing spray was being applied thereto.

This data is presented in FIG. 1. The graphical presentation correlates the data for the relationship of the thickness of the coating composition and the resulting shading coefficient. The correlation is one which generally has two separate functions interconnected by a transition point. In the case of FIG. 1, a first function, defined by a line 1, is one in which the shading coefficient decreases with increasing coating thickness. The second function, defined by a line 2, is one in which the shading coefficient remains relatively constant, although the coating thickness is increasing. These two different functions are interconnected by a transition point 3. Thus, the graph of FIG. 1 indicates that applying any more than 85 nm thickness of film is waste of film material because there is no increase in the benefit to the improvement in the shading coefficient.

Thus, under this set of conditions, our method now goes on by coating commercial quantities of glass with the selected coating composition to a thickness which is plus or minus approximately 10% of the coating thickness of 85 nm where the shading coefficient goes through its transition point 3. Thus, in the situation where a ⅛ inch grey glass is having an 80% cobalt-20% iron film sprayed thereon, the thickness of the film should be in the range from 76.5 to 93.5 nm, preferably at about 85 nm.

EXAMPLE 2

The method of this invention is illustrated in this example for a different type of glass. In this case, the glass is a 7/32 inch thick bronze body color glass to which a spray composition consisting of an organic based 95% cobalt-5% iron dissolved in an appropriate solvent is applied. As was the case with Example 1, a number of samples were generated having various film thicknesses. The results of this application to the many samples is reported in Table 2 below and graphed in FIG. 2.

| Example | Shading Coefficient | Thickness |
|---------|---------------------|-----------|
| 1 | .41 | 60 |
| 2 | .38 | 65 |
| 3 | .34 | 75 |
| 4 | .32 | 77 |
| 5 | .31 | 90 |
| 6 | .31 | 103 |
| 7 | .31 | 121 |

Figure 2:
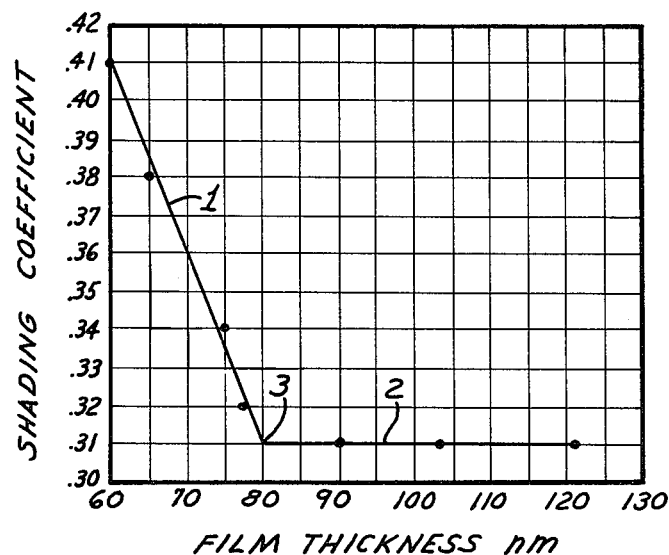
FIG. 2 is a similar graphical presentation of data obtained on glass samples on which a 95% cobalt-5% iron containing spray was applied.

Once again it is seen that the relationship between the film thickness and the shading coefficient defines a first straight line function 1 in which the shading coefficient decreases with increasing coating thickness. Also the graphical presentation of the data shown in FIG. 2 shows that a second function 2 is established between the data in which the shading coefficient remains relatively constant although the coating thickness is increasing. The two separate functions are once again interconnected by a transition point 3.

The correlated data in this situation for the particular film glass combination disclosed in this example is one in which the shading coefficient of 0.31 is reached at about 80 nm thickness of coating composition.

Therefore, commercial quantities of glass would be coated to a thickness of 80 nm plus or minus 10%; that is, in a range from 72 nm to 88 nm. This would give the most economical thickness of coating resulting in the best coating characteristics.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of obtaining coated glass articles having a desired shading coefficient with the most economical thickness of coating composition thereon, which method is characterized by the steps of:

coating a plurality of glass samples with a selected coating composition in a manner such that said glass samples have different coating thicknesses thereon;

measuring the thickness of said coating composition and the shading coefficient of each of the plurality of glass samples;

correlating the relationship of said thickness of said coating composition and said resulting shading coefficient, said correlation generally being defined by two separate functions interconnected by a transition point, a first of said two separate functions being one in which said shading coefficient decreases with increasing coating thickness and a second of said two separate functions being one in which said shading coefficient remains relatively constant although said coating thicknesses are increasing; and, thereafter, coating commercial quantities of glass with said selected coating composition to a coating thickness which is plus or minus 10% of the coating thickness at said transition point where said correlated relationship between said coating thickness and said shading coefficient goes from said first function to said second function.

2. The method of claim 1, wherein commercial quantities of glass are coated with said selected coating composition to a coating thickness which is plus or minus 5% of the coating thickness at said transition point where said correlated relationship between said coating thickness and said shading coefficient goes from said first function to said second function.

3. The method of claim 1, wherein the relationship of said thickness of said coating composition and said resulting shading coefficient are correlated by graphing the same.

4. The method of claim 2, wherein the relationship of said thickness of said coating composition and said resulting shading coefficient are correlated by graphing the same.

* * * * *